US011503174B2

(12) United States Patent
Ikeda et al.

(10) Patent No.: US 11,503,174 B2
(45) Date of Patent: Nov. 15, 2022

(54) IMAGE FORMING APPARATUS THAT INSTALLS APPLICATIONS, CONTROL METHOD THEREFOR, AND STORAGE MEDIUM

(71) Applicant: CANON KABUSHIKI KAISHA, Tokyo (JP)

(72) Inventors: Atsushi Ikeda, Toride (JP); Hiroshi Oya, Nagareyama (JP); Yasunori Shimakawa, Komae (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/223,337

(22) Filed: Apr. 6, 2021

(65) Prior Publication Data
US 2021/0227089 A1 Jul. 22, 2021

Related U.S. Application Data

(63) Continuation of application No. 15/785,734, filed on Oct. 17, 2017, now Pat. No. 10,999,464.

(30) Foreign Application Priority Data

Oct. 24, 2016 (JP) .............................. JP2016-207667

(51) Int. Cl.
*G06F 3/0481* (2022.01)
*G06F 3/0482* (2013.01)
(Continued)

(52) U.S. Cl.
CPC ....... *H04N 1/00941* (2013.01); *G06F 3/0481* (2013.01); *G06F 3/0482* (2013.01);
(Continued)

(58) Field of Classification Search
CPC ........... H04N 1/00941; H04N 1/00915; H04N 1/4406; H04N 1/00408; H04N 1/00411;
(Continued)

(56) References Cited

U.S. PATENT DOCUMENTS 5,600,346 A 2/1997 Kamata
5,877,741 A * 3/1999 Chee .................. G09G 5/39
345/629
(Continued)

FOREIGN PATENT DOCUMENTS

JP 2000341461 A 12/2000
JP 2001243037 A 9/2001
(Continued)

OTHER PUBLICATIONS

Office Action issued in Japanese Appln. No. 2016-207667 dated Nov. 10, 2020.
(Continued)

*Primary Examiner* — Jordany Nunez
(74) *Attorney, Agent, or Firm* — Rossi, Kimms & McDowell LLP (57) ABSTRACT

An image forming apparatus which is capable of appropriately producing displays using installed expansion application modules without using a window manager module. The image forming apparatus produces a display in accordance with a display instruction for at least one of the installed expansion application modules. When display instructions for the expansion application modules overlap each other, priorities for display are assigned based on starting conditions related to the expansion application modules.

17 Claims, 10 Drawing Sheets

(51) Int. Cl.
  *G06F 3/0488* (2022.01)
  *H04N 1/00* (2006.01)
  *H04N 1/44* (2006.01)
  *G09G 5/36* (2006.01)

(52) U.S. Cl.
  CPC ....... *H04N 1/00915* (2013.01); *H04N 1/4406* (2013.01); *G09G 5/363* (2013.01); *G09G 2340/0464* (2013.01); *G09G 2354/00* (2013.01); *H04N 1/00408* (2013.01); *H04N 1/00411* (2013.01); *H04N 2201/0089* (2013.01); *H04N 2201/0094* (2013.01)

(58) Field of Classification Search
  CPC ... H04N 2201/0089; H04N 2201/0094; G09G 5/363; G09G 2340/0464; G09G 2354/00
  See application file for complete search history.

(56) References Cited

U.S. PATENT DOCUMENTS

| | | | |
|---|---|---|---|
| 7,106,298 B1 | 9/2006 | Turner | |
| 7,546,547 B2* | 6/2009 | Carey | G06F 9/451 715/266 |
| 8,165,558 B2* | 4/2012 | Cook | H04M 1/72409 455/425 |
| 8,879,078 B2* | 11/2014 | Tsujimoto | H04N 1/00482 358/1.13 |
| 9,911,377 B2* | 3/2018 | Howard | G06Q 30/0241 |
| 10,067,670 B2* | 9/2018 | Weaver | H04M 1/72469 |
| 10,200,444 B1 | 2/2019 | Mitchell | |
| 10,838,740 B2* | 11/2020 | Senda | H04N 1/00896 |
| 2001/0047435 A1 | 11/2001 | Dove | |
| 2003/0169306 A1 | 9/2003 | Makipaa | |
| 2004/0150678 A1 | 8/2004 | Jeong | |
| 2005/0036509 A1* | 2/2005 | Acharya | H04N 21/4753 370/467 |
| 2011/0102841 A1* | 5/2011 | Morita | H04N 1/00408 358/1.15 |
| 2012/0005601 A1 | 1/2012 | Mori | |
| 2012/0314241 A1* | 12/2012 | Uchikawa | H04N 1/00477 358/1.14 |
| 2013/0033718 A1 | 2/2013 | Tsujimoto | |
| 2014/0108996 A1* | 4/2014 | Maekawa | G06F 9/4881 715/781 |
| 2014/0176976 A1* | 6/2014 | Tsukahara | G06K 15/406 358/1.13 |
| 2014/0279030 A1* | 9/2014 | Eye | G06Q 30/0267 705/14.64 |
| 2015/0180943 A1* | 6/2015 | Cradick | G06F 3/0481 715/747 |
| 2016/0103756 A1* | 4/2016 | McClung | G06F 11/0751 714/38.1 |
| 2016/0342294 A1* | 11/2016 | Weaver | G06F 3/0488 |
| 2016/0343350 A1* | 11/2016 | Khoury | G06F 3/04883 |
| 2017/0139658 A1* | 5/2017 | Nagata | G06F 3/04817 |
| 2018/0138999 A1* | 5/2018 | Hida | H04W 4/029 |
| 2019/0303173 A1* | 10/2019 | Senda | H04N 1/00896 |

FOREIGN PATENT DOCUMENTS

| | | |
|---|---|---|
| JP | 2004127280 A | 4/2004 |
| JP | 2007279792 A | 10/2007 |
| JP | 2010186281 A | 8/2010 |

OTHER PUBLICATIONS

Office Action issued in U.S. Appl. No. 15/785,734 dated Jul. 9, 2019.

Office Action issued in U.S. Appl. No. 15/785,734 dated Oct. 23, 2019.

Office Action issued in U.S. Appl. No. 15/785,734 dated Aug. 4, 2020.

Notice of Allowance issued in U.S. Appl. No. 15/785,734 dated Jan. 6, 2021.

* cited by examiner

IMAGE FORMING APPARATUS THAT INSTALLS APPLICATIONS, CONTROL METHOD THEREFOR, AND STORAGE MEDIUM

BACKGROUND OF THE INVENTION

Field of the Invention

The present invention relates to an image forming apparatus, a control method therefor, and a storage medium.

Description of the Related Art

An MFP which is an image forming apparatus newly installing applications for expanding functions (hereafter referred to as "expansion applications") is known. The MFP executes, for example, an expansion application that performs a screen saver function and displays a slideshow, which prevents burn-in of a display unit of the MFP, on the display unit (see Japanese Laid-Open Patent Publication (Kokai) No. 2000-341461). The MFP also executes an expansion application that performs a superimposed display function of displaying a message in a manner being superimposed on an image displayed on the display unit (see Japanese Laid-Open Patent Publication (Kokai) No. 2010-186281). Expansion applications produce displays under the control of a window manager module provided in the MFP. The window manager module manages display instructions for expansion applications, and for example, performs arbitration or the like when display instructions for a plurality of expansion applications overlap each other. This enables the expansion applications to appropriately produce displays.

However, there is lately a strong demand for inexpensive MFPs, and hence MFPs equipped with no window manager module are introduced on the market. When display instructions for a plurality of expansion applications overlap each other, the MFPs equipped with no window manager module cannot perform arbitration of the overlapping display instructions, and as a result, the expansion applications cannot appropriately produce displays.

SUMMARY OF THE INVENTION

The present invention provides an image forming apparatus and a control method therefor which appropriately produce displays using expansion application modules without using a window manager module, as well as a storage medium.

Accordingly, the present invention provides an image forming apparatus that produces a display in accordance with a display instruction for at least one of a plurality of installed expansion application modules, wherein when display instructions for the plurality of expansion application modules overlap each other, priorities for display are assigned based on starting conditions related to the expansion application modules.

According to the present invention, it is possible to appropriately produce displays using expansion application modules without using a window manager module.

Further features of the present invention will become apparent from the following description of exemplary embodiments (with reference to the attached drawings).

DESCRIPTION OF THE EMBODIMENTS

Hereafter, an embodiment of the present invention will be described in detail with reference to the drawings.

Figure 1:
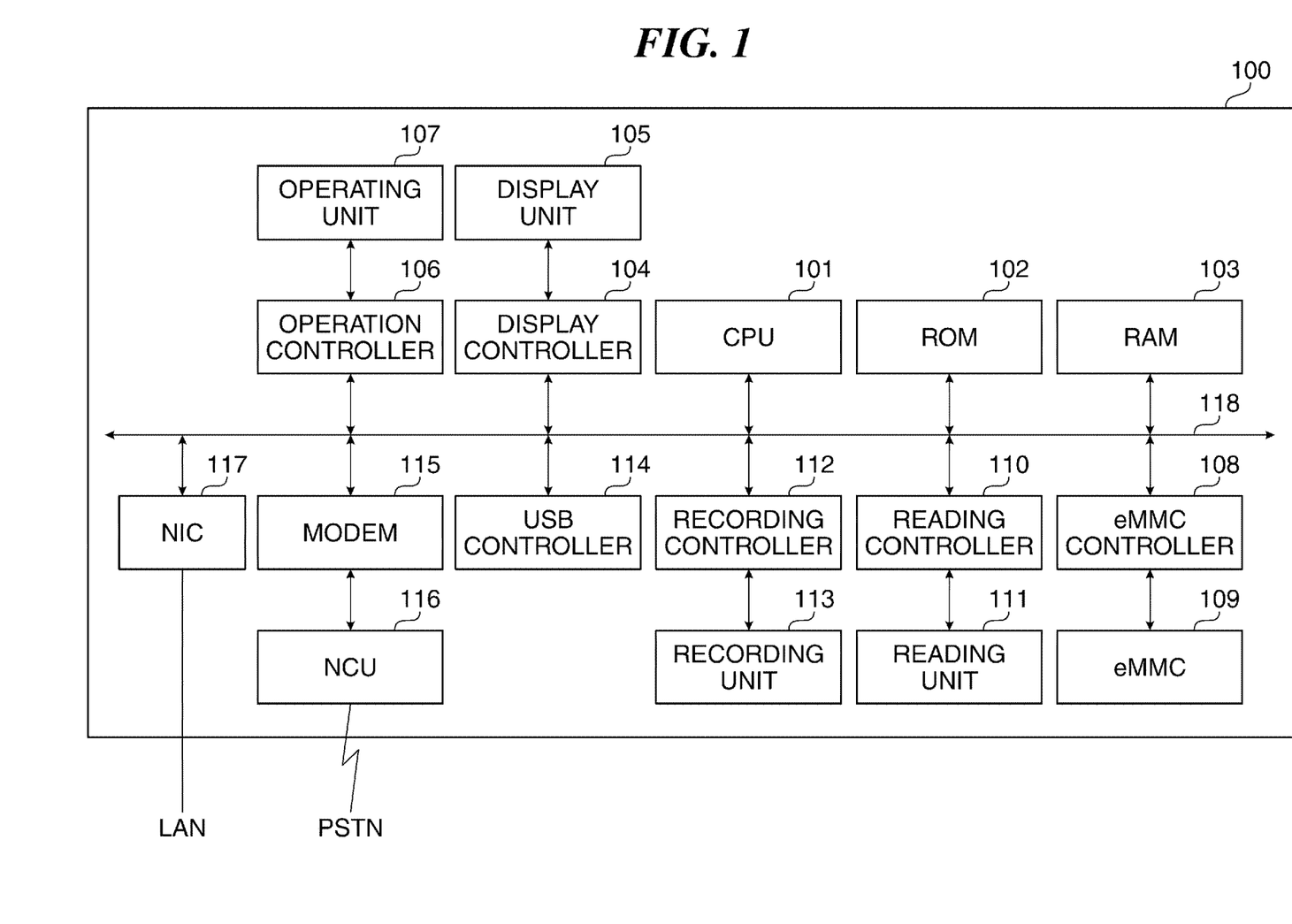
FIG. 1 is a block diagram schematically showing an arrangement of an MFP which is an image forming apparatus according to an embodiment of the present invention.

FIG. 1 is a block diagram schematically showing an arrangement of an MFP 100 which is an image forming apparatus according to an embodiment of the present invention.

Referring to FIG. 1, the MFP 100 has a CPU 101, a ROM 102, a RAM 103, a display controller 104, a display unit 105, an operation controller 106, and an operating unit 107. The MFP 100 also has an eMMC (embedded MultiMedia-Card) controller 108, an eMMC 109, a reading controller 110, a reading unit 111, a recording controller 112, and a recording unit 113. In addition, the MFP 100 has a USB controller 114, a MODEM 115, an NCU (Network Control Unit) 116, and a NIC (Network Interface Card) 117. Such component elements as the CPU 101, the ROM 102, the RAM 103, the display controller 104, the operation controller 106, the eMMC controller 108, the reading controller 110, the recording controller 112, the USB controller 114, the MODEM 115, and the NIC 117 are connected to one another via a system bus 118.

The MFP 100 executes such jobs as copying, scanning, and facsimile communication. The MFP 101 is able to newly install a plurality of expansion apps. In the present embodiment, it is assumed that, for example, a login app 208, a screen saver app 209, and a generic app 210 in FIG. 2, to be described later, are installed in the MFP 100. The CPU 101 centrally controls the component elements connected to the system bus 118. The CPU 101 carries out processes of an OS module 200 in FIG. 2, to be described later, by executing programs stored in the ROM 102. The ROM 102 stores programs which are executed by the CPU 101. The RAM 103 is used as a work area for the CPU 101 and also used as a temporary storage area for a variety of data.

The display controller 104 controls display on the display unit 105. The display unit 105 is a touch-panel LCD which is able to display a bitmapped image in full screen in a WVGA size. The operation controller 106 carries out data communications with the operating unit 107, and for example, receives input information such as a job executing instruction inputted through operation on the operating unit 107 by a user. The operating unit 107 is comprised of, for example, an operating button displayed on the display unit 105. In the present embodiment, the display unit 105 and the operating unit 107 are used as a user interface of the MFP 100.

The eMMC controller 108 carries out data communications with the eMMC 109, and the eMMC 109 stores a variety of data. The reading controller 110 carries out data communications with the reading unit 111, and the reading unit 111 reads a placed original, generates image data of the original, and sends the generated image data to the reading controller 110. The recording controller 112 carries out data communications with the recording unit 113, and the recording unit 113 performs printing on a recording sheet based on image data or the like obtained from the recording controller 112.

The USB controller 114 carries out data communications with a USB memory or the like, not shown, connected to the MFP 100. The MODEM 115 carries out a modulation process and a demodulation process for signals so as to carry out fax communications. The NCU 116 carries out fax communications with an external apparatus, not shown, via a public switched telephone network (PSTN). The NIC 117 sends and receives e-mails and a variety of data to and from the external apparatus, not shown, via a LAN.

Figure 2:
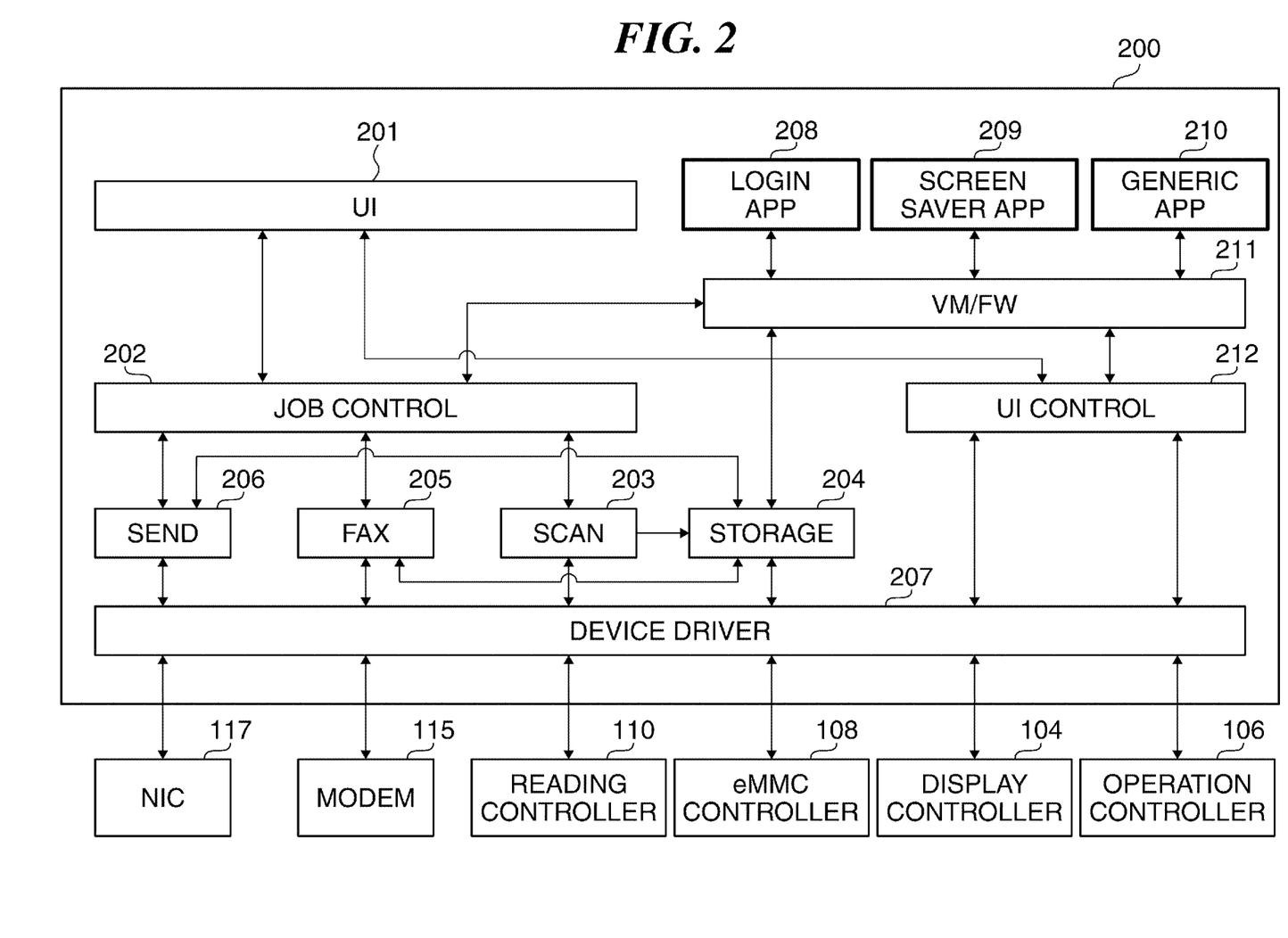
FIG. 2 is a block diagram schematically showing an arrangement of an OS module of the MFP in FIG. 1.

FIG. 2 is a block diagram schematically showing an arrangement of the OS module 200 of the MFP 100 in FIG. 1.

Referring to FIG. 2, the OS module 200 has a UI (user interface) module 201, a job control module 202, a scan module 203, a storage module 204, a fax module 205, and a sending module 206. The OS module 200 also has a device driver module 207, a login app 208 (authentication application module), a screen saver app 209 (display function deterioration suppressing application module), and a generic app 210. In addition, the OS module 200 has a VM (virtual machine)/FW (framework) module 211, and a UI control module 212. Processes of the OS module 200 are implemented by the CPU 101 executing programs stored in the ROM 102. It should be noted that in the present embodiment, it is assumed that no window manager module is installed which performs arbitration when display instructions for a plurality of expansion apps overlap each other.

The OS module 200 is a program for carrying out processes of the MFP 100. The UI module 201 implements a user interface function of the MFP 100 and controls processes related to the display unit 105 and the operating unit 107. For example, the UI module 201 instructs the UI control module 212 to display a UI image of the MFP 100 recorded in a VRAM or the like, not shown. The UI module 201 also notifies the job control module 202 that an operation on the operating unit 107 has been performed in accordance with a job executing instruction.

The job control module 202 manages accepted jobs and also controls execution of the jobs. The scan module 203 controls the reading unit 111 and carries out a scanning process for a placed original. For example, when a fax sending job is accepted, the scan module 203 carries out the scanning process for a placed original, generates image data based on information read off the original, and requests the storage module 204 to store the generated image data. The storage module 204 controls execution of storage processing of a variety of data and manages a variety of data stored therein. For example, based on an image data storage request received from the scan module 203, the storage module 204 stores image data in the eMMC 109. The fax module 205 controls fax communications via the NCU 116. For example, the fax module 205 obtains image data stored in the eMMC 109 or the like from the storage module 204 and sends the obtained image data to the external apparatus, not shown, via fax communication.

The sending module 206 controls data communications via the NIC 117. The device driver module 207 acts as an intermediary in communications carried out between hardware devices of the MFP 100 and the OS module 200. The hardware devices of the MFP 100 are, for example, the display controller 104, the operation controller 106, the eMMC controller 108, the reading controller 110, the MODEM 115, and the NIC 117.

The login app 208, the screen saver app 209, and the generic app 210 are expansion apps which are comprised of programs described in script languages or the like. Each of the login app 208, the screen saver app 209, and the generic app 210 has a metafile in which attribute information on the expansion app is set. For example, "login" which indicates an attribute of the login app 208 is set in the metafile of the login app 208, "screenSaver" which indicates an attribute of the screen saver app 209 is set in the metafile of the screen saver app 209, and "generic" which indicates an attribute of the generic app 210 is set in the metafile of the generic app 210.

The login app 208 has an authentication function of carrying out an authentication process for a user who uses the MFP 100. The login app 208 is set to "enable" which enables the authenticating function or "disable" which disables the authenticating function. The login app 208 set to "enable" is started on starting of the MFP 100 and continues running until an operation ending instruction issued from the user is received. When the login app 208 is started, an authentication information setting screen, not shown, on which the user enters information for use in the authentication process such as a user ID and a password is displayed on the display unit 105. The screen saver app 209 has a screen saver function of suppressing deterioration in the display function of the display unit 105. The screen saver app 209 is started, for example, when no operation has been performed on the operating unit 107 for a predetermined time period, or when an access from the generic app 210 is made, and stops running when an operation on the operating unit 107 by the user is detected. When the screen saver app 209 is started, a screen saver screen such as a slideshow which prevents burn-in of the display unit 105 is displayed on the display unit 105. The generic app 210 is started when an operation on the operating unit 107 by the user is detected, carries out a process corresponding to the detected operation, and stops running after completing the process. When the generic app 210 is started, a setting screen on which setting information on a process corresponding to a detected operation is to be set is displayed on the display unit 105.

The VM/FW module 211 controls execution of an installing process and an uninstalling process for an expansion app. The VM/FW module 211 also analyzes an installed expansion app and controls starting of the expansion app. Specifically, the VM/FW module 211 starts an expansion app corresponding to attribute information stored in a VM, not shown, provided in the VM/FW module 211. In the present embodiment, when starting conditions prescribed in advance are satisfied, attribute information in a metafile of an expansion app corresponding to the starting conditions is stored in the VM. For example, when the login app 208 is set to "enable" at startup of the MFP 100, or when the login app 208 is switched from "disable" to "enable" during operation of the MFP 100, "login" indicating the attribute of the login app 208 is stored in the VM. When no operation has been performed on the operating unit 107 for a predetermined time period, or when a starting instruction is issued from the expansion app with the attribute "generic", "screenSaver" indicating the attribute of the screen saver app 209 is stored in the VM. When an operation on the operating unit 107 by the user is detected, "generic" indicating the attribute of the generic app 210 is stored in the VM. In response to starting of an expansion app, the VM/FW module 211 controls display for the expansion app, and as a display instruction for the expansion app notifies, the UI control module 212 of a drawing request as well as a request to use the display unit 105. The VM/FW module 211 also accepts a job for the started expansion app.

Figure 3:
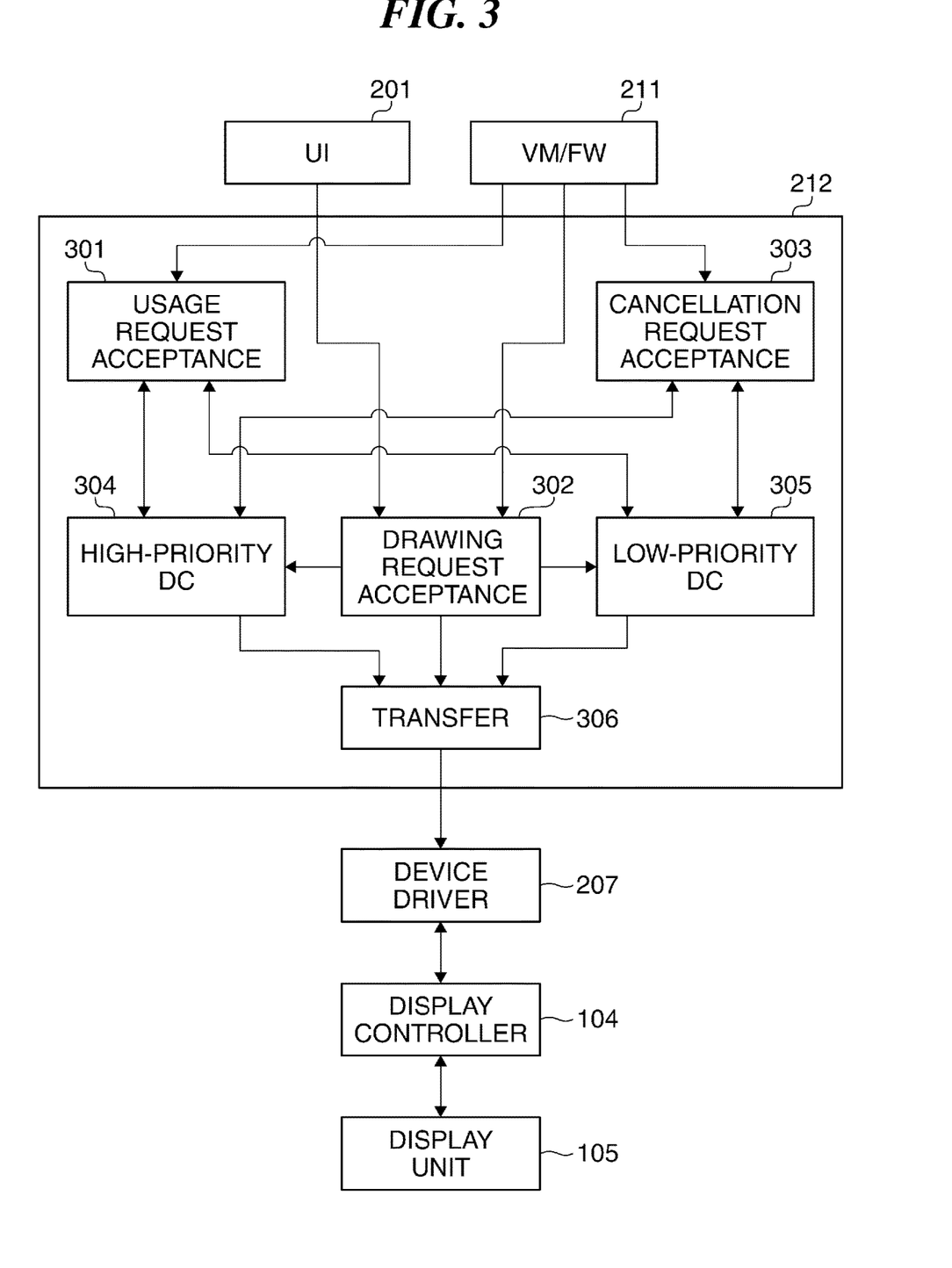
FIG. 3 is a block diagram schematically showing an arrangement of a UI control module in FIG. 2.

As shown in FIG. 3, the UI control module 212 has a usage request acceptance module 301, a drawing request acceptance module 302, a cancellation request acceptance module 303, a high-priority DC (display context) 304, a low-priority DC 305, and a transfer module 306. The UI control module 212 manages display instructions sent from the UI module 201 and the VM/FW module 211 and controls display in accordance with the display instructions. In the present embodiment, for normal display on the display unit 105, the UI control module 212 displays drawing data according to a display instruction for the UI module 201. Upon receiving a display instruction for the expansion app, the UI control module 212 superimposes drawing data on the display unit 105 according to the display instruction for the expansion app and produces a display according to the display instruction for the expansion app.

The usage request acceptance module 301 accepts a request to use the display unit 105 by the expansion app from the VM/FW module 211. The drawing request acceptance module 302 receives the drawing request made by the UI module 201 and the VM/FW module 211. The cancellation request acceptance module 303 receives an instruction to cancel the request to use the display unit 105 by the expansion app from the VM/FW module 211. The high-priority DC 304 and the low-priority DC 305 hold drawing data according to the display instruction for the expansion app and manages usage conditions of the display unit 105. In the high-priority DC 304, drawing data to be displayed with higher priority than that in the low-priority DC 305 is stored. The transfer module 306 transfers drawing data stored in the VRAM, the high-priority DC 304, and the low-priority DC 305 and the like to the display unit 105 via the device driver module 207.

Figure 4:
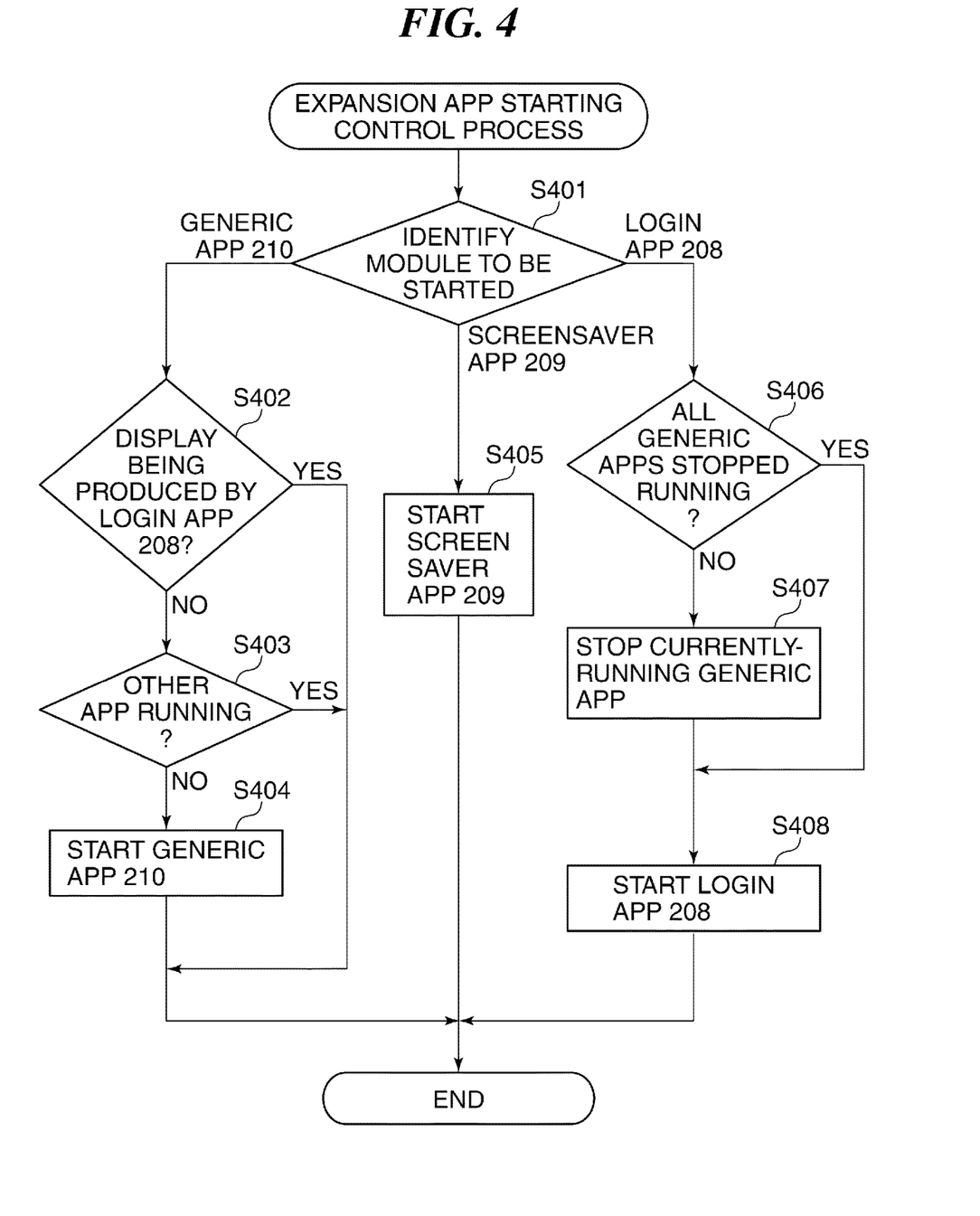
FIG. 4 is a flowchart showing the procedure of an expansion app starting control process which is carried out by a VM/FW module in FIG. 2.

FIG. 4 is a flowchart showing the procedure of an expansion app starting control process which is carried out by the VM/FW module 211 in FIG. 2.

The process in FIG. 4 is carried out when starting conditions for one of the expansion apps i.e. the login app 208, the screen saver app 209, and the generic app 210 are satisfied. At this time, in the MFP 100, attribute information on the expansion app for which the starting conditions are satisfied is stored in the VM.

Referring to FIG. 4, first, the VM/FW module 211 identifies a module to be started from among the login app 208, the screen saver app 209, and the generic app 210 (step S401). In the step S401, the VM/FW module 211 identifies the module to be started using attribute information stored in the VM based on the starting conditions. Specifically, when "login" is stored in the VM, the VM/FW module 211 determines that the module to be started is the login app 208. When "screenSaver" is stored in the VM, the VM/FW module 211 determines that the module to be started is the screen saver app 209, and when "generic" is stored in the VM, the VM/FW module 211 determines that the module to be started is the generic app 210.

When, in the step S401, the generic app 210 is identified as the module to be started, the VM/FW module 211 determines whether or not a display is being produced on the display unit 105 by the login app 208 (step S402).

As a result of the determination in the step S402, when a display is being produced on the display unit 105 by the login app 208, the VM/FW module 211 ends the present process. On the other hand, as a result of the determination in the step S402, when no display is being produced on the display unit 105 by the login app 208, the VM/FW module 211 determines whether or not any generic app, not shown, other than the generic app 210 is running (step S403).

As a result of the determination in the step S403, when any other generic app is running, the VM/FW module 211 ends the present process. On the other hand, as a result of the determination in the step S403, when no other generic app is running, the VM/FW module 211 starts the generic app 210 (step S404). Upon completing the starting of the generic app 210, the VM/FW module 211 sends, as a display instruction for the generic app 210, a request to use the display unit 105 by the generic app 210 to the usage request acceptance module 301. The VM/FW module 211 also sends a drawing request made by the generic app 210 to the drawing request acceptance module 302. Specifically, in the present embodiment, the display instruction for the generic app 210 does not overlap with at least a display instruction for any other generic app or a display instruction for the login app 208. After that, the VM/FW module 211 ends the present process.

When, in the step S401, the screen saver app 209 is identified as the module to be started, the VM/FW module 211 starts the screen saver app 209 (step S405). Upon completing the starting of the screen saver app 209, the VM/FW module 211 sends, as a display instruction for the screen saver app 209, a request to use the display unit 105 by the screen saver app 209 to the usage request acceptance module 301. The VM/FW module 211 also sends a drawing request made by the screen saver app 209 to the drawing request acceptance module 302. After that, the VM/FW module 211 ends the present process.

When, in the step S401, the login app 208 is identified as the module to be started, the VM/FW module 211 determines whether or not all the installed generic apps have stopped running (step S406).

As a result of the determination in the step S406, when all the installed generic apps have stopped running, the VM/FW module 211 carries out processes in step S408 and the subsequent steps, to be described later. On the other hand, as a result of the determination in the step S406, when any of the installed generic apps is running, the VM/FW module 211 stops the running generic app (step S407). Then, the VM/FW module 211 starts the login app 208 (step S408). Upon completing the starting of the login app 208, the VM/FW module 211 sends, as the display instruction for the login app 208, a request to use the display unit 105 by the login app 208 to the usage request acceptance module 301. The VM/FW module 211 also sends a drawing request made by the login app 208 to the drawing request acceptance module 302. Specifically, in the present embodiment, when any expansion app is started, the UI control module 212 is immediately notified of a display instruction for the started expansion app. After that, the VM/FW module 211 ends the present process.

Figure 5:
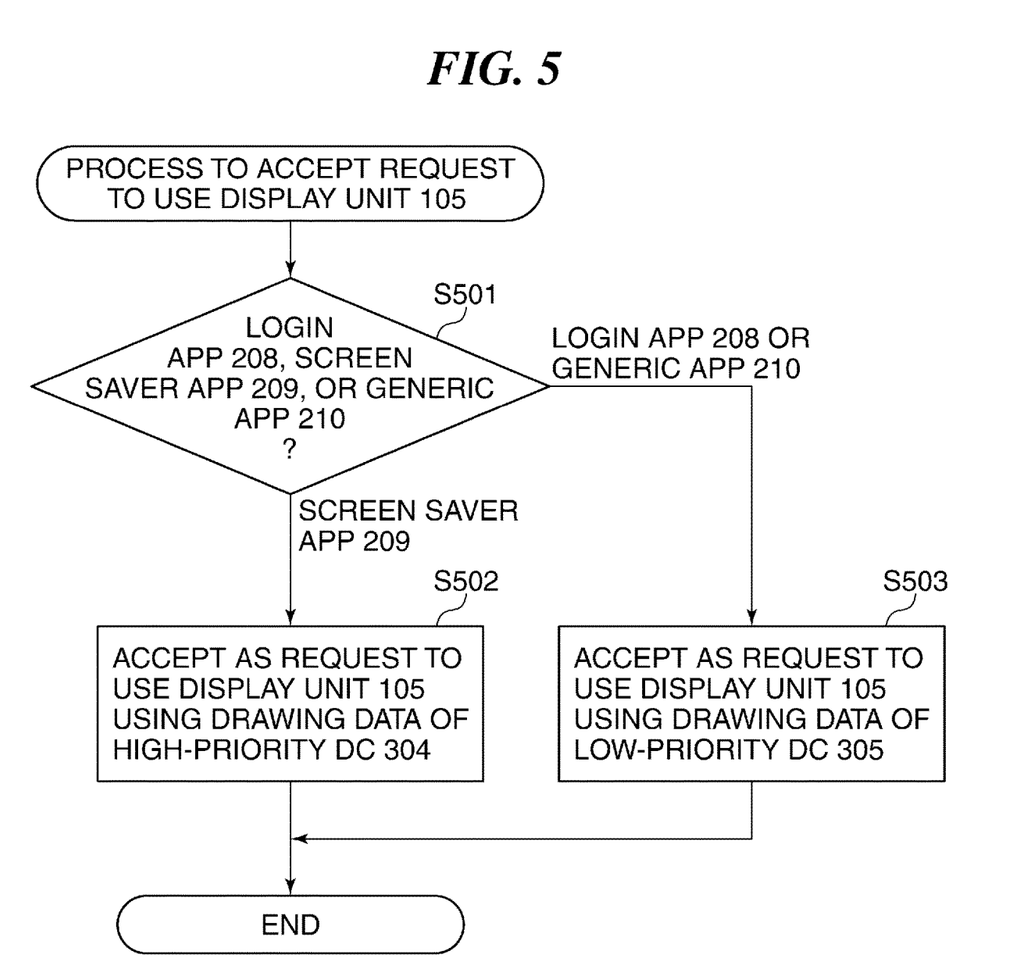
FIG. 5 is a flowchart showing the procedure of a display unit usage request acceptance process which is carried out by a usage request acceptance module in FIG. 3.

FIG. 5 is a flowchart showing the procedure of a process to accept a request to use the display unit 105, which is carried out by the usage request acceptance module 301 in FIG. 3.

The process in FIG. 5 is carried out when a request to use the display unit 105 by one of the login app 208, the screen saver app 209, and the generic app 210 is received.

Here, the MFP 100 is controlled to some extent by the above described process in FIG. 4 such that when any expansion app is started, this expansion app and any other expansion app are not running at the same time, but there may be cases where a plurality of expansion apps is running at the same time. Specifically, there may be a case where the screen saver app 209 and the login app 208 are running at the same time, or a case where the screen saver app 209 and the generic app 210 are running at the same time. In such cases, display instructions for two expansion apps overlap each other, but the MFP 100 with no window manager module cannot perform arbitration of the overlapping display instructions and thus cannot enable the expansion apps to appropriately produce displays.

To address this problem, in the present embodiment, when display instructions for a plurality of expansion apps overlap each other, priorities for display are assigned to the expansion apps based on starting conditions for them.

Referring to FIG. 5, first, using attribute information stored in the VM based on the starting conditions, the usage request acceptance module 301 determines whether or not a module that is to use the display unit 105 is the login app 208, the screen saver app 209, or the generic app 210 (step S501). Specifically, when "login" is stored in the VM, the usage request acceptance module 301 determines that the module that is to use the display unit 105 is the login app 208. When "screenSaver" is stored in the VM, the usage request acceptance module 301 determines that the module that is to use the display unit 105 is the screen saver app 209. When "generic" is stored in the VM, the usage request acceptance module 301 determines that the module that is to use the display unit 105 is the generic app 210.

As a result of the determination in the step S501, when the module that is to use the display unit 105 is the screen saver app 209, the usage request acceptance module 301 accepts the received usage request as a request to use the display unit 105 using drawing data in the high-priority DC 304 (step S502). After that, the usage request acceptance module 301 sends a DC identifier indicative of the high-priority DC 304 to the module that is to use the display unit 105, and ends the present process.

As a result of the determination in the step S501, when the module that is to use the display unit 105 is the login app 208 or the generic app 210, the usage request acceptance module 301 accepts the received usage request as a request to use the display unit 105 using drawing data in the low-priority DC 305 (step S503). Specifically, in the present embodiment, priorities for display are assigned to expansion apps based on starting conditions therefor, and a high priority is given to a display produced by the screen saver app 209 among a plurality of installed expansion apps. After that, the usage request acceptance module 301 sends a DC identifier indicative of the low-priority DC 305 to the module that is to use the display unit 105, and ends the present process.

Figure 6:
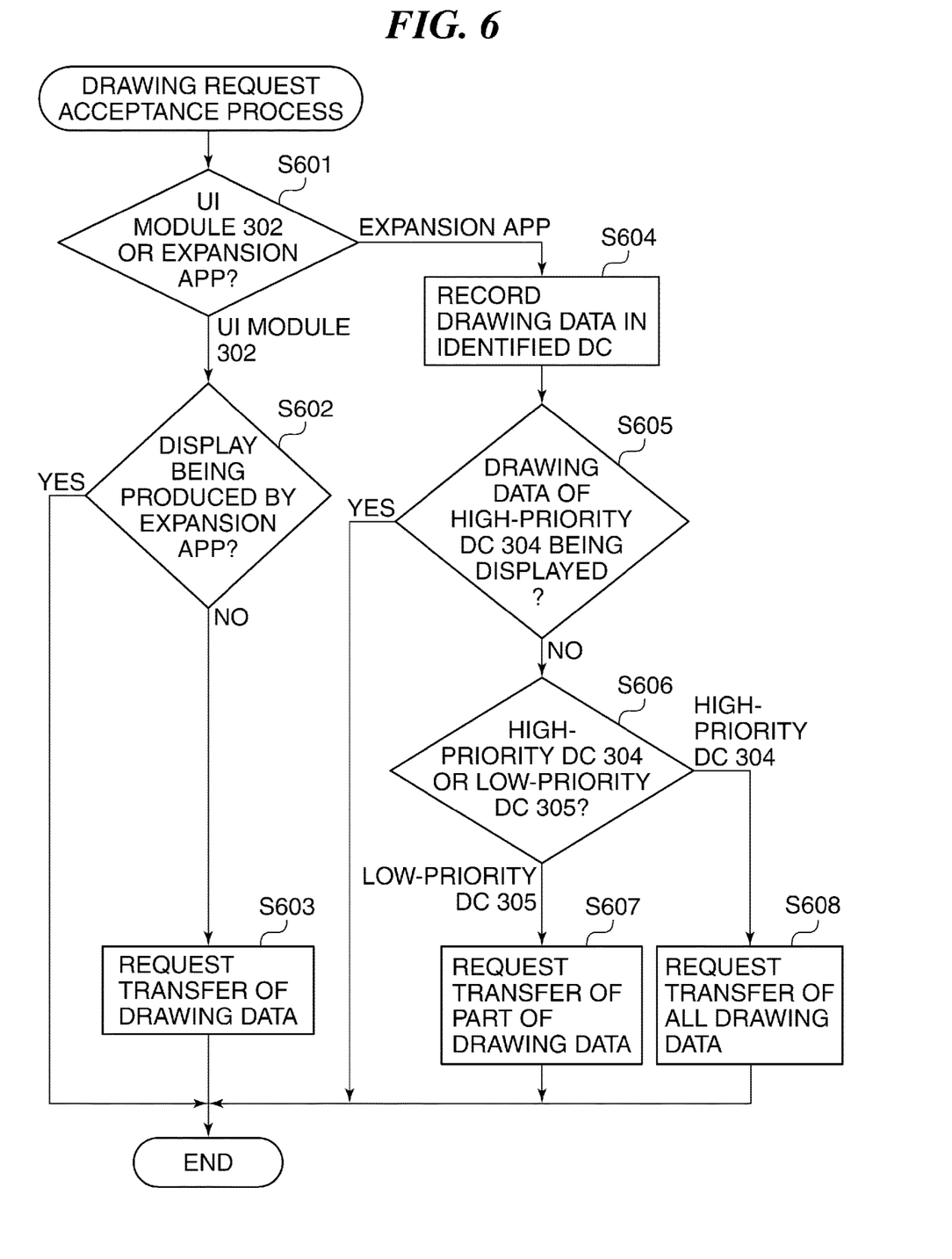
FIG. 6 is a flowchart showing the procedure of a drawing request acceptance process which is carried out by a drawing request acceptance module in FIG. 3.

FIG. 6 is a flowchart showing the procedure of a drawing request accepting process which is carried out by the drawing request acceptance module 302 in FIG. 3.

The process in FIG. 6 is carried out when the drawing request acceptance module 302 has received a drawing request made by any of the UI module 201, the login app 208, the screen saver app 209, and the generic app 210.

Referring to FIG. 6, first, the drawing request acceptance module 302 determines whether or not a module that a module corresponding to the received drawing request (hereafter referred to as "the drawing request corresponding module") is the UI module 201 or any of expansion apps (step S601).

As a result of the determination in the step S601, when the drawing request corresponding module is the UI module 201, the drawing request acceptance module 302 determines whether or not a display is being produced on the display unit 105 by the expansion app (step S602).

As a result of the determination in the step S602, when the display is being produced on the display unit 105 by the expansion app, the drawing request acceptance module 302 ends the present process. On the other hand, as a result of the determination in the step S602, when the display is not being produced on the display unit 105 by the expansion app, the drawing request acceptance module 302 requests the transfer module 306 to transfer drawing data according to the drawing request (step S603). As a result, drawing data recorded in the VRAM is transferred to the display unit 105, and a display is produced on the display unit 105 according to the display instruction from the UI module 201. After that, the drawing request acceptance module 302 ends the present process.

As a result of the determination in the step S601, when the drawing request corresponding module is the expansion app, the drawing request acceptance module 302 obtains a DC identifier of the drawing request corresponding module. The drawing request acceptance module 302 identifies a DC corresponding to the obtained DC identifier from the high-priority DC 304 and the low-priority DC 305 and records drawing data according to the drawing request in the identified DC (step S604). The recorded drawing data is held in the DC. The drawing request acceptance module 302 then determines whether or not drawing data of the high-priority DC 304 is being displayed on the display unit 105 (step S605).

As a result of the determination in the step S605, when the drawing data of the high-priority DC 304 is being displayed on the display unit 105, the drawing request acceptance module 302 ends the present process. On the other hand, as a result of the determination in the step S605, when the drawing data of the high-priority DC 304 is not being displayed on the display unit 105, the drawing request acceptance module 302 determines whether or not the identified DC is the high-priority DC 304 or the low-priority DC 305 (step S606).

Figure 7:
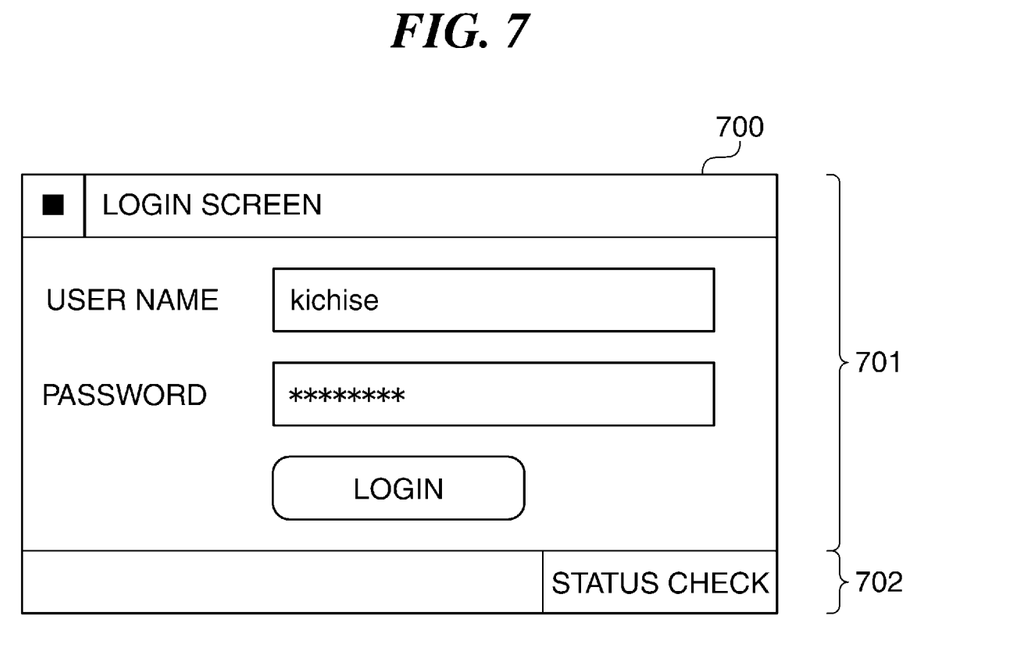
FIG. 7 is a view showing an exemplary operating screen which is displayed on the display unit in FIG. 1.

As a result of the determination in the step S606, when the identified DC is the low-priority DC 305, the drawing request acceptance module 302 requests the transfer module 306 to transfer a part of the drawing data recorded in the low-priority DC 305 (step S607). As a result, the part of the drawing data recorded in the low-priority DC 305 is transferred to the display unit 105, and the transferred drawing data is superimposed on some area of the display unit 105. For example, when a display is being produced on the display unit 105 by the UI module 201, and the drawing request corresponding module is the login app 208, an operating screen 700 in FIG. 7 is displayed on the display unit 105. The operating screen 700, which is a screen obtained by combining a display produced by the UI module 201 and a display produced by the login app 208, includes a display area 701 for the login app 208 and a display area 702 for the UI module 201. After that, the drawing request acceptance module 302 ends the present process.

As a result of the determination in the step S606, when the identified DC is the high-priority DC 304, the drawing request acceptance module 302 requests the transfer module 306 to transfer all of drawing data recorded in the high-priority DC 304 (step S608). As a result, all of the drawing data recorded in the high-priority DC 304 is transferred to the display unit 105, and a display is produced on the display unit 105 by the screen saver app 209. After that, the drawing request acceptance module 302 ends the present process.

Figure 8:
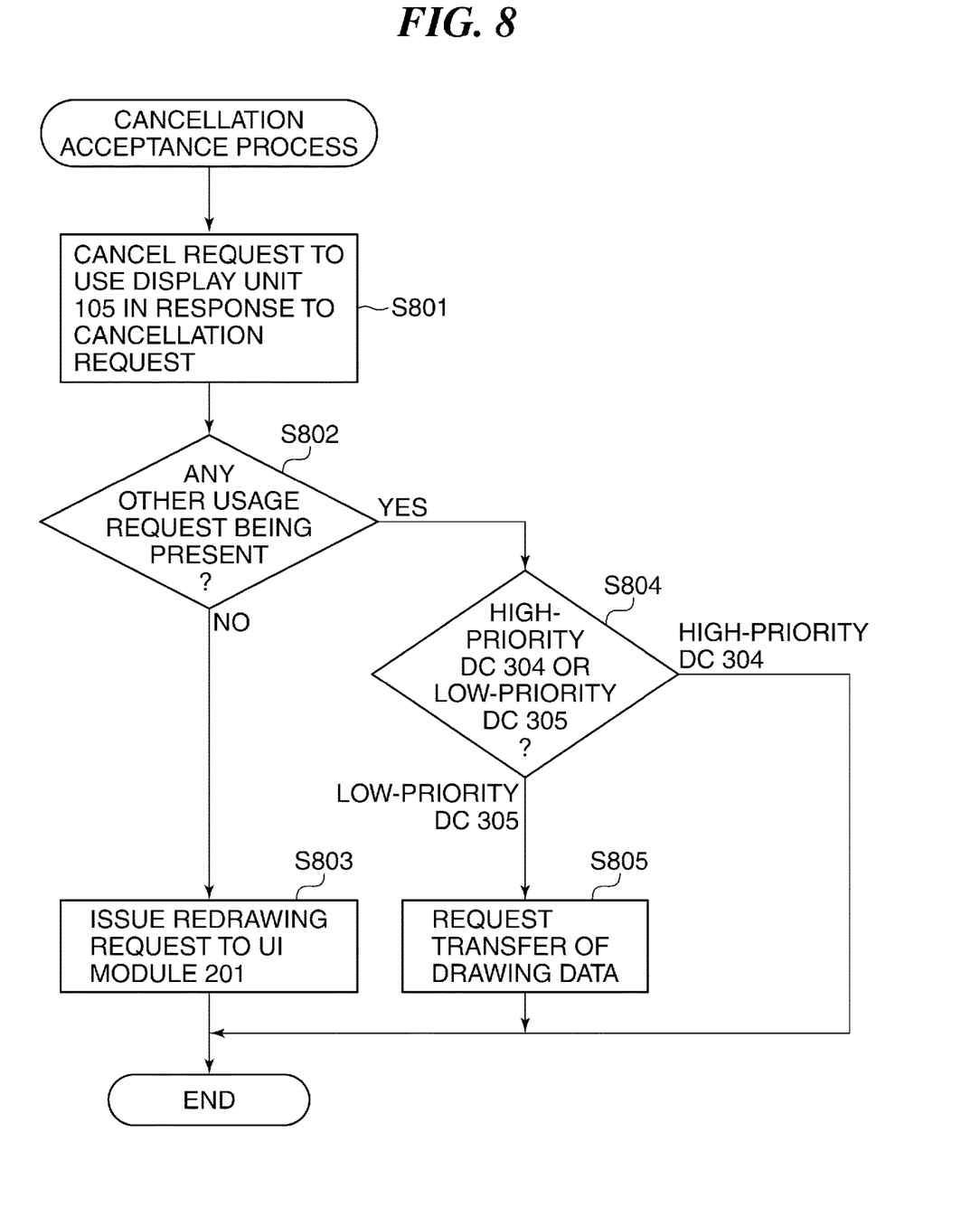
FIG. 8 is a flowchart showing the procedure of a cancellation acceptance process which is carried out by a cancellation request acceptance module in FIG. 3.

FIG. 8 is a flowchart showing the procedure of a cancellation accepting process which is carried out by the cancellation request acceptance module 303 in FIG. 3.

The process in FIG. 8 is carried out when the cancellation request acceptance module 303 has received an instruction to cancel a request to use the display unit 105 using drawing data in the high-priority DC 304 or a request to use the display unit 105 using drawing data in the low-priority DC 305. Also, the process in FIG. 8 is based on the assumption that a display is being produced on the display unit 105 by one of the UI module 201, the login app 208, the screen saver app 209, and the generic app 210.

In the process in FIG. 8, first, the cancellation request acceptance module 303 cancels the request to use the display unit 105 in accordance with the received cancellation instruction (step S801). As a result, drawing data recorded in a DC suitable for the usage request is deleted. Next, the cancellation request acceptance module 303 determines whether or not there is any other usage request other than the canceled usage request (step S802).

As a result of the determination in the step S802, when there is no other usage request, the cancellation request acceptance module 303 issues a redrawing request to the UI module 201 (step S803). As a result, the UI module 201 issues the display instruction to the UI control module 212, and a display is produced on the display unit 105 by the UI module 201. After that, the cancellation request acceptance module 303 ends the present process.

As a result of the determination in the step S802, when there is any other usage request, the cancellation request acceptance module 303 determines whether or not the other usage request is a request to use the display unit 105 based on drawing data of the high-priority DC 304 or the low-priority DC 305 (step S804).

As a result of the determination in the step S804, when the other usage request is a request to use the display unit 105 based on drawing data of the high-priority DC 304, a display is being produced on the display unit 105 based on the drawing data of the high-priority DC 304. Namely, even when the request to use the display unit 105 is canceled in accordance with the cancellation instruction in the process in the step S801, display on the display unit 105 is not affected since no drawing data required for display on the display unit 105 is missing. The cancellation request acceptance module 303 continues display on the display unit 105 and ends the present process.

As a result of the determination in the step S804, when the other usage request is a request to use the display unit 105 based on drawing data of the low-priority DC 305, the cancellation request acceptance module 303 requests the transfer module 306 to transfer the drawing data recorded in the low-priority DC 305 (step S805). As a result, the transfer module 306 transfers the drawing data recorded in the low-priority DC 305 to the display unit 105, which in turn produces a display using the drawing data of the low-priority DC 305, for example, a display by the login app 208 or the generic app 210. After that, the cancellation request acceptance module 303 ends the present process.

According to the embodiment described above, when display instructions for a plurality of expansion apps overlap each other, priorities for display are assigned to the expansion apps based on starting conditions therefor. This eliminates the need to perform arbitration or the like when a plurality of expansion apps overlap. As a result, displays are appropriately produced by expansion apps without using the window manager module.

Moreover, in the embodiment described above, when the display instruction for the screen saver app 209 overlaps with the display instruction for another expansion apps, a priority is given to a display produced by the screen saver app 209 according to the display instruction for the screen saver app 209. Therefore, a priority is given to display of the screen saver screen that prevents burn-in of the display unit 105, and this reliably suppresses deterioration in the display function of the MFP 100.

Furthermore, in the embodiment described above, when the display instruction for the UI module 201 and the display instruction for the login app 208 overlap each other, a display is produced by combining a display produced according to the display instruction for the UI module 201 and a display produced according to the display instruction for the login app 208. Here, the functions of the UI module 201 and the login app 208 are ensured if a display is produced according to the display instruction for the UI module 201 in a part of the display unit 105, and a display is produced according to the display instruction for the login app 208 in another part of the display unit 105. Namely, neither a display produced according to the display instruction for the UI module 201 nor a display produced according to the display instruction for the login app 208 should be full screen on the display unit 105. Therefore, as compared to the case where priorities are assigned to displays, producing displays at the same time is rational since it would improve the ease of operation for the user while maintaining a high security level of the MFP 100. Accordingly, in the present embodiment, when the display instruction for the UI module 201 and the display instruction for the login app 208 overlap each other, a display is produced by combining a display produced according to the display instruction for the UI module 201 and a display produced according to the display instruction for the login app 208. This improves the ease of operation for the user while maintaining a high security level of the MFP 100.

In the embodiment, when, for example, a predetermined time period has passed while a display is being produced on the display unit 105 by the login app 208, the display is switched to a display by the screen saver app 209 to which a higher display priority is given than to the login app 208. When the display on the display unit 105 is switched to a display by the screen saver app 209, the authentication function of the login app 208 cannot be performed in the MFP 100, and a user who has not been successfully authenticated is allowed to submit a job by way of the screen saver app 209. This lowers the security level of the MFP 100.

To address this problem, in the present embodiment, a job for expansion app to which a higher priority for display is assigned than to the login app 208 among a plurality of expansion apps is not accepted.

Figure 9:
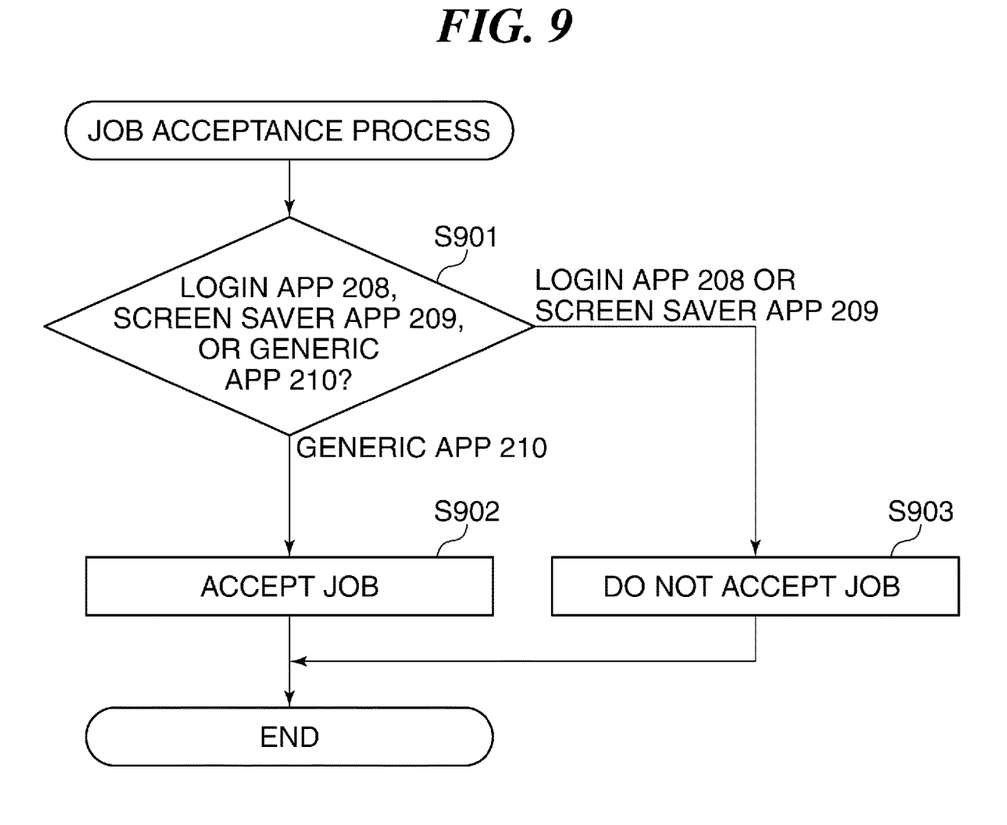
FIG. 9 is a flowchart showing the procedure of a job acceptance process which is carried out by the VM/FW module in FIG. 2.

FIG. 9 is a flowchart showing the procedure of a job acceptance process which is carried out by the VM/FW module 211 in FIG. 2.

The process in FIG. 9 is carried out when the VM/FW module 211 has received a job execution request notification from one of the login app 208, the screen saver app 209, and the generic app 210.

Referring to FIG. 9, first, upon receiving the job execution request notification, the VM/FW module 211 determines whether or not a sender of the job execution request notification is the login app 208, the screen saver app 209, or the generic app 210 (step S901).

When, in the step S901, the sender of the job execution request notification is the generic app 210, the VM/FW module 211 accepts a job in response to the job execution request (step S902) and ends the present process.

In the step S901, when the sender of the job execution request notification is the login app 208 or the screen saver app 209, the VM/FW module 211 does not accept the job in response to the job execution request (step S903). The VM/FW module 211 notifies the sender of the job execution request notification that the job is not accepted, and ends the present process.

In the present embodiment, the job for the expansion app to which a higher display priority is given than to the login app 208 among a plurality of expansion apps is not accepted. This avoids a situation in which a job submitted from the expansion app to which a higher display priority is given than to the login app 208 is executed and thus prevents degradation in the security level of the MFP 100.

Figure 10:
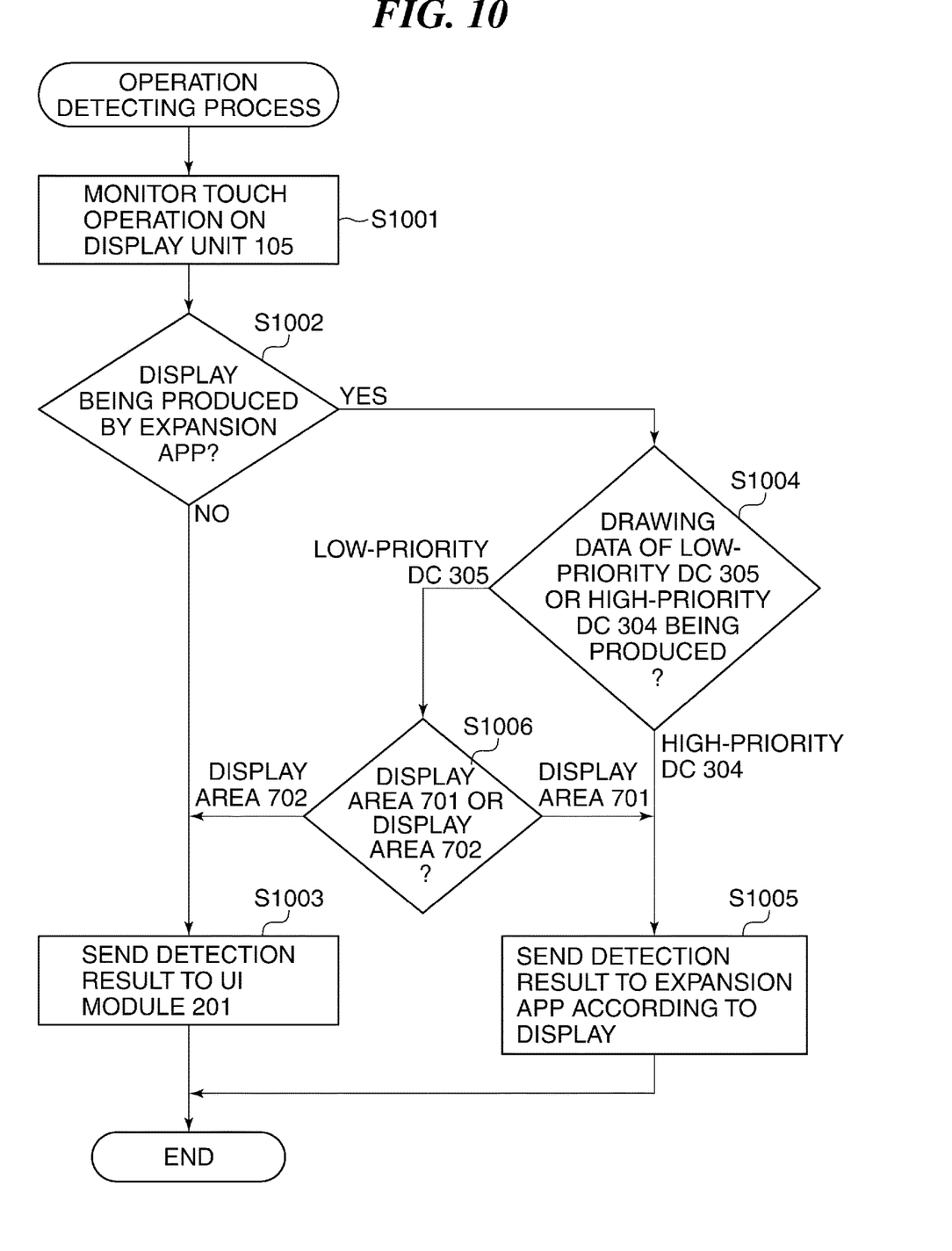
FIG. 10 is a flowchart showing the procedure of an operation detecting process which is carried out by the UI control module in FIG. 2.

FIG. 10 is a flowchart showing the procedure of an operation detecting process which is carried out by the UI control module 212 in FIG. 2.

Referring to FIG. 10, first, the UI control module 212 periodically monitors operations on the operating unit 107, that is, touch operations on the display unit 105 (step S1001). Upon detecting the touch operation on the display unit 105, the UI control module 212 determines whether or not a display is being produced on the display unit 105 by the expansion app (step S1002).

As a result of the determination in the step S1002, when no display is being produced on the display unit 105 by the expansion app, the UI control module 212 sends the detection result of the touch operation on the display unit 105 to the UI module 201 (step S1003) and ends the present process.

As a result of the determination in the step S1002, when a display is being produced on the display unit 105 by the expansion app, the UI control module 212 determines whether or not drawing data in the high-priority DC 304 or the low-priority DC 305 is being displayed on the display unit 105 (step S1004).

As a result of the determination in the step S1004, when drawing data in the low-priority DC 305 is being displayed, the UI control module 212 sends the detection result to the expansion app corresponding to the display (step S1005). Specifically, the UI control module 212 sends the detection result to the screen saver app 209. After that, the UI control module 212 ends the present process. On the other hand, as a result of the determination in the step S1004, when drawing data in the low-priority DC 305 is being displayed, the UI control module 212 identifies a position at which the touch operation was performed on the display unit 105. When, for example, the operating screen 700 is being displayed on the display unit 105, the UI control module 212 determines whether or not the position at which the touch operation was performed on the display unit 105 is the display area 701 or the display area 702 (step S1006).

As a result of the determination in the step S1006, when the position at which the touch operation was performed on the display unit 105 is the display area 701, the UI control module 212 carries out the process in the step S1005. Specifically, the UI control module 212 sends the detection result as to the display unit 105 to the login app 208 which is the expansion app for display in the display area 701. After that, the UI control module 212 ends the present process.

As a result of the determination in the step S1006, when the position at which the touch operation was performed on the display unit 105 is the display area 702, the UI control module 212 carries out the process in the step S1003.

Although in the present embodiment described above, the MFP 100 is unequipped with the window manager module which performs, for example, arbitration when display instructions for a plurality of expansion apps overlap each other, the MFP 100 may be equipped with the window manage module. The window manage module performs a window system function of displaying, in one screen, a plurality of windows for a plurality of applications and switching the windows as well as the function of performing arbitration for overlapping display instructions. The window system function is controlled to be on and off by the user, and when the window system function is off, the window manage module stops. In this case, it becomes impossible to perform arbitration for overlapping display instructions using the window manage module, but in the present embodiment, priorities for display are assigned to the expansion apps based on starting conditions therefor. As a result, displays are appropriately produced by the expansion apps without using the window manage module.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions for the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-207667, filed Oct. 24, 2016, which is hereby incorporated by reference herein in its entirety.

What is claimed is:

1. An image forming apparatus that produces a display in accordance with a display instruction for at least one of a plurality of installed application, the image forming apparatus comprising:
a display unit;
a memory configured to store instructions; and
one or more processors configured to execute the instructions to:
determine drawing data to be displayed on the display unit from among drawing data corresponding to a display instruction for an installed first application and drawing data corresponding to a display instruction for an installed second application according to an attribute of an installed first application that received a start instruction and an attribute of an installed second application that received a start instruction, the attribute of the installed first application and the attribute of the installed second application having predefined display priorities based on a starting condition for the installed first application and a starting condition for the installed second application, the predefined display priorities for the installed first application and the installed second application being changed based on whether a current condition of the image forming apparatus corresponds to the starting condition for the installed first application or the starting condition for the installed second application; and
display the determined drawing data on the display unit.

2. The image forming apparatus according to claim 1, wherein the installed first application is a screen saver application and the installed second application is a login application.

3. The image forming apparatus according to claim 1, wherein the installed first application is a generic application and the installed second application is a login application.

4. The image forming apparatus according to claim 1, wherein the attribute of the installed first application is "screenSaver" and the attribute of the installed second application is "login".

5. The image forming apparatus according to claim 1, wherein the attribute of the installed first application is "generic" and the attribute of the installed second application is "login".

6. The image forming apparatus according to claim 1, wherein the drawing data corresponding to the display instruction for the installed first application is determined as the drawing data to be displayed on the display unit.

7. The image forming apparatus according to claim 1, wherein the drawing data corresponding to the display instruction for the installed first application is made to be held by a first display context, and the drawing data corresponding to the display instruction for the installed second application is made to be held by a second display context.

8. The image forming apparatus according to claim 1, wherein the drawing data held by the first display context is displayed preferentially than the drawing data held by the second display context.

9. A control method for an image forming apparatus that produces a display in accordance with a display instruction for at least one of a plurality of installed application, the control method comprising:
determining drawing data to be displayed on a display unit from among drawing data corresponding to a display instruction for an installed first application and drawing data corresponding to a display instruction for an installed second application according to an attribute of an installed first application that received a start instruction and an attribute of an installed second application that received a start instruction, the attribute of the installed first application and the attribute of the installed second application having predefined display priorities based on a starting condition for the installed first application and a starting condition for the installed second application, the predefined display priorities for the installed first application and the installed second application being changed based on whether a current condition of the image forming apparatus corresponds to the starting condition for the installed first application or the starting condition for the installed second application; and
displaying the determined drawing data on the display unit.

10. The control method for the image forming apparatus according to claim 9, wherein the installed first application is a screen saver application and the installed second application is a login application.

11. The control method for the image forming apparatus according to claim 9, wherein the installed first application is a generic application and the installed second application is a login application.

12. The control method for the image forming apparatus according to claim 9, wherein the attribute of the installed first application is "screenSaver" and the attribute of the installed second application is "login".

13. The control method for the image forming apparatus according to claim 9, wherein the attribute of the installed first application is "generic" and the attribute of the installed second application is "login".

14. The control method for the image forming apparatus according to claim 9, wherein the drawing data corresponding to the display instruction for the installed first application is determined as the drawing data to be displayed on the display unit.

15. The control method for the image forming apparatus according to claim 9, wherein the drawing data corresponding to the display instruction for the installed first application is made to be held by a first display context, and the drawing data corresponding to the display instruction for the installed second application is made to be held by a second display context.

16. The control method for the image forming apparatus according to claim 9, wherein the drawing data held by the first display context is displayed preferentially than the drawing data held by the second display context.

17. A non-transitory computer-readable storage medium storing a program for causing a computer to execute a control method for an image forming apparatus that produces a display in accordance with a display instruction for at least one of a plurality of installed expansion application modules, the control method for the image forming apparatus comprising:
determining drawing data to be displayed on a display unit from among drawing data corresponding to a display instruction for an installed first application and drawing data corresponding to a display instruction for an installed second application according to an attribute of an installed first application that received a start instruction and an attribute of an installed second application that received a start instruction, the attribute of the installed first application and the attribute of the installed second application having predefined display priorities based on a starting condition for the installed first application and a starting condition for the installed second application, the predefined display priorities for the installed first application and the installed second application being changed based on whether a current condition of the image forming apparatus corresponds to the starting condition for the installed first application or the starting condition for the installed second application; and displaying the determined drawing data on the display unit.

* * * * *